US011347463B2

(12) United States Patent
Feyereisen et al.

(10) Patent No.: US 11,347,463 B2
(45) Date of Patent: May 31, 2022

(54) CORRELATIVE DISPLAY SYSTEM WITH DECLUTTERED DISPLAYS FOR AIRCRAFT

(71) Applicant: HONEYWELL INTERNATIONAL INC., Morris Plains, NJ (US)

(72) Inventors: Thea Feyereisen, Hudson, WI (US); Rakshit Ramakrishna, Bangalore (IN); Pramod Kumar Malviya, Bangalore (IN); Bryan Weaver, Phoenix, AZ (US); Brock Graham, Phoenix, AZ (US); Gang He, Morris Plains, NJ (US); Emmanuel Letsu-Dake, Shakopee, MN (US); Rui Wang, Morris Plains, NJ (US); Subash Samuthirapandian, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 398 days.

(21) Appl. No.: 16/458,890

(22) Filed: Jul. 1, 2019

(65) Prior Publication Data

US 2020/0133611 A1 Apr. 30, 2020

(30) Foreign Application Priority Data

Oct. 31, 2018 (IN) .............................. 201841041164

(51) Int. Cl.
*G06F 3/14* (2006.01)
*G01C 23/00* (2006.01)
*G08G 5/00* (2006.01)

(52) U.S. Cl.
CPC ........... *G06F 3/1431* (2013.01); *G01C 23/00* (2013.01); *G08G 5/003* (2013.01); *G08G 5/0021* (2013.01); *G08G 5/0091* (2013.01)

(58) Field of Classification Search
CPC ...... G06F 3/1431; G06F 3/147; G06F 3/1423; G06F 3/048; G01C 23/00; G08G 5/0021;
(Continued)

(56) References Cited

U.S. PATENT DOCUMENTS

| 5,920,276 A | 7/1999 | Frederick |
| 6,112,141 A | 8/2000 | Briffe et al. |

(Continued)

FOREIGN PATENT DOCUMENTS

| EP | 0957418 A2 | 11/1999 |
| EP | 1323150 B1 | 4/2005 |

(Continued)

*Primary Examiner* — James J Lee
*Assistant Examiner* — Shon G Foley
(74) *Attorney, Agent, or Firm* — Lorenz & Kopf, LLP (57) ABSTRACT

A system and method of operating a correlative display system for a plurality of display systems on an aircraft includes receiving, by a processor, an identification of a feature from a user interface associated with a first display system of the plurality of display systems. The processor determines a location of the identified feature relative to data displayed on each other display system of the plurality of display systems, wherein the identified feature is not previously displayed on at least one of the other display systems of the plurality of display systems. The processor generates instructions to highlight the identified feature on each other display system of the plurality of display systems at the determine location relative to data displayed on each other display system.

15 Claims, 11 Drawing Sheets

(58) Field of Classification Search
CPC ...... G08G 5/0091; G08G 5/003; G08G 5/006; G08G 5/0052; G08G 5/0086; G08G 5/0073; G09G 5/08; G09G 5/12; G09G 2354/00; G09G 2380/12
See application file for complete search history.

(56) References Cited

U.S. PATENT DOCUMENTS

| | | | |
|---|---|---|---|
| 6,381,519 | B1 | 4/2002 | Snyder |
| 8,793,039 | B1 | 7/2014 | Hammack et al. |
| 9,234,982 | B2 | 1/2016 | Ramaiah et al. |
| 2008/0307370 | A1* | 12/2008 | Cabaret ................ G06F 3/0481 715/856 |
| 2010/0077359 | A1* | 3/2010 | Shinawaki ............. G01C 21/36 715/846 |
| 2013/0027226 | A1* | 1/2013 | Cabos ................ G08G 5/0021 340/961 |
| 2019/0162555 | A1* | 5/2019 | Youssef ............... G08G 5/0021 |

FOREIGN PATENT DOCUMENTS

| | | |
|---|---|---|
| EP | 2595021 A1 | 5/2013 |
| KR | 100901301 B1 | 6/2009 |

* cited by examiner

CORRELATIVE DISPLAY SYSTEM WITH DECLUTTERED DISPLAYS FOR AIRCRAFT

CROSS-REFERENCE TO RELATED APPLICATIONS

The present application claims benefit of prior filed Indian Provisional Patent Application 201841041164, filed Oct. 31, 2018, which is hereby incorporated by reference herein in its entirety.

TECHNICAL FIELD

The present disclosure generally relates to an aircraft, and more particularly relates to systems and methods for an aircraft display system.

BACKGROUND

Aircraft often include multiple displays in a cockpit, each display displaying data related to the aircraft or a flight plan. The displays may include, for example, vertical situation displays, lateral situation displays, synthetic vision displays, personal electronic devices, and the like. The displays are generally not redundant. In other words, each display generally displays relevant data or overlapping data (which may be the same), but from a different perspective. For example, a vertical situation display displays flight plan data from a vertical perspective and a lateral situation display displays flight plan data from a lateral perspective. As each display displays different data, often from a different perspective and/or from a different scale, it can often be challenging or time consuming to correlate data between the different displays.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft includes a flight management system and a correlative display system. The flight management system is configured to monitor flight plan data for the aircraft, where the flight plan data is indicative of a planned flight path. The correlative display system is communicatively coupled to the flight management system and includes a plurality of displays, a user interface system, and a processor. Each of the plurality of displays is operable to display data relevant to the planned flight path. The user interface system is configured to receive user input. The processor is communicatively coupled to the plurality of displays and the user interface, and is configured to: determine when the user input received by the user interface corresponds to a feature on a first of the plurality of displays; identify the feature on the first of the plurality of displays; determine a location of the identified feature relative to the data displayed on each other of the plurality of displays, wherein the identified feature is not previously displayed on at least one of the other of the plurality of displays; and generate instructions for the other of the plurality of displays to highlight the feature at the determined location for each of the other plurality of displays.

In another embodiment, a method of operating a correlative display system for a plurality of display systems on an aircraft includes receiving, by a processor, an identification of a feature from a user interface associated with a first display system of the plurality of display systems. The processor determines a location of the identified feature relative to data displayed on each other display system of the plurality of display systems, wherein the identified feature is not previously displayed on at least one of the other display systems of the plurality of display systems. The processor generates instructions to highlight the identified feature on each other display system of the plurality of display systems at the determine location relative to data displayed on each other display system.

In yet another embodiment, a correlative display system includes a plurality of displays, a user interface, and a processor. Each of the plurality of displays is operable to display different flight plan data. The user interface system is configured to receive user input. The processor is communicatively coupled to the plurality of displays and the user interface, and is configured to: determine when the user input received by the user interface corresponds to a feature on a first of the plurality of displays; identify the feature on the first of the plurality of displays; determine a location of the identified feature relative to the data displayed on each other of the plurality of displays, wherein the identified feature is not previously displayed on at least one of the other of the plurality of displays; and generate instructions for the other of the plurality of displays to highlight the feature at the determined location for each of the other plurality of displays.

Furthermore, other desirable features and characteristics of the correlative display system and method will become apparent from the subsequent detailed description and the appended claims, taken in conjunction with the accompanying drawings and the preceding background.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With a user interface, such as a cursor control device (CCD) a pilot can select a feature on a first display system, such as a lateral map, and perform an action, such as an FMS direct to navigation on a waypoint. Additionally, a pilot may select a feature to get more information. For example, an airspace could have a pop-up window that provides the dimensions of the airspace. However, if the same airspace, waypoint or other feature is presented on another display, such as a vertical situation display or a synthetic vision system display, there is no correlation between the displays. In other words, a pilot could mistake a feature on one display system as a different feature on another display system as there has been no correlation between different display systems. This creates extra workload for the pilot as they would have had to figure out the corresponding feature on other display systems, which introduces potential errors in interpretation. Accordingly, as discussed in further detail below, a correlative display system is provided which connects features between display systems.

Figure 1:
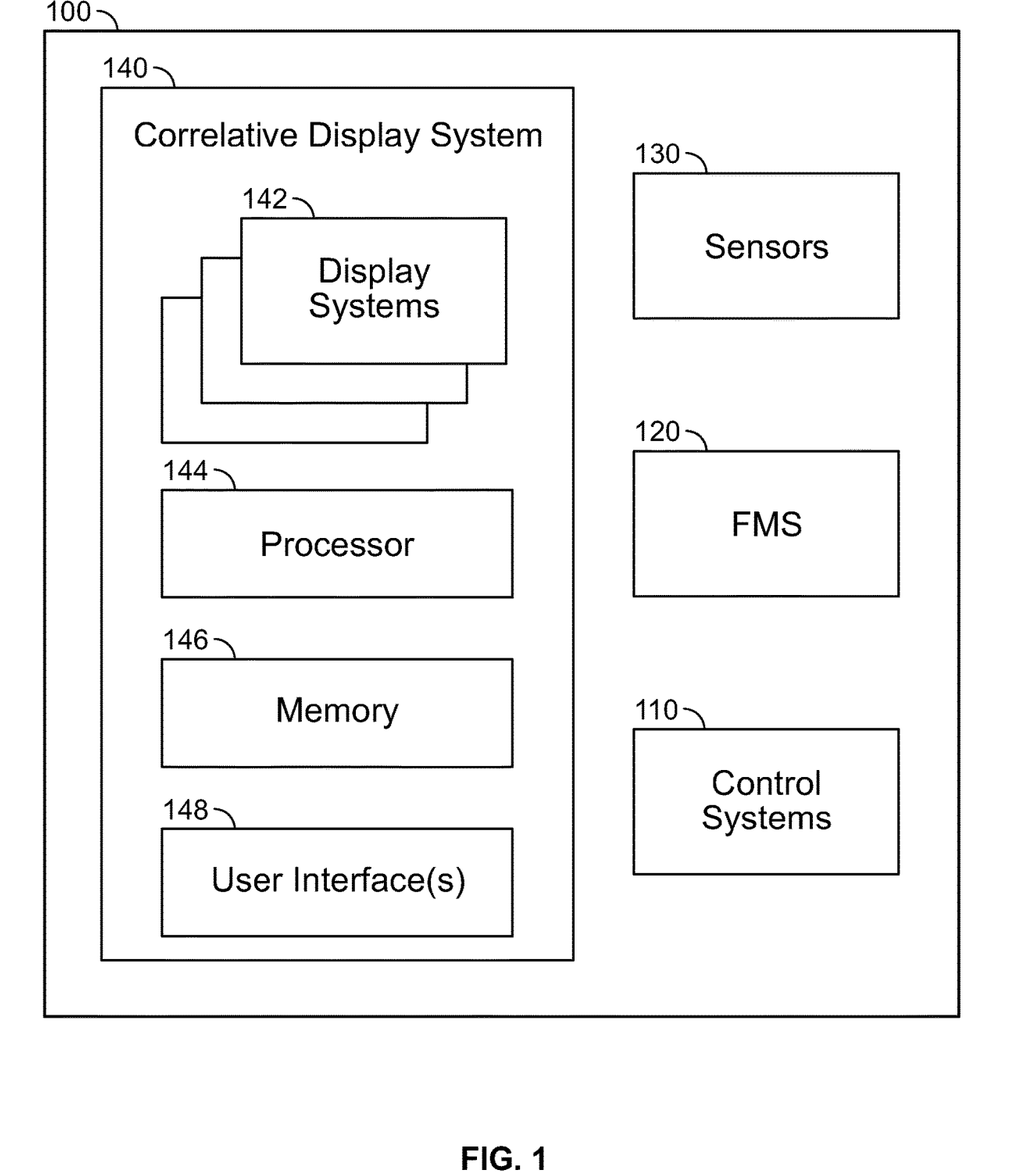
FIG. 1 is a block diagram of an aircraft, in accordance with an embodiment.

FIG. 1 is a block diagram of an aircraft 100, in accordance with an embodiment. The aircraft 100 may be an airplane, a helicopter, a spacecraft, a drone, or the like, or any combination thereof. The aircraft includes multiple controls systems 110 for controlling the movement of the aircraft 100. The controls systems 110 will vary depending upon the type of aircraft 100, but may include, for example, one or more engines, rudders, wings, vertical stabilizers, flaps, landing gear, propellers, and the like.

The aircraft 100 further includes a flight management system (FMS) 120. The flight management system 120 manages a flight plan of the aircraft and may use sensors 130 to guide the aircraft along the flight plan utilizing one or more of the control systems 110. The sensors 130 may include, for example, a global positioning system (GPS) sensor, an altitude sensor, a wind speed sensor, a wind direction sensor, or the like.

The aircraft 100 further includes a correlative display system 140. The correlative display system 140 links features between multiple display systems 142 on the aircraft 100. Each of the display systems may display different data. The display systems 142 may include, for example, a vertical situation display, a synthetic vision system display, a lateral situation display system, waypoint list, a personal electronic device (e.g., a tablet computer, a laptop computer, a smart watch, etc.), or any other aircraft display system, and any combination thereof. While some of the displayed data may be displayed on more than one display system 142, the data is displayed in a different format or from a different perspective (e.g., a vertical situation display and a lateral situation display may both display flight plan data, but from different perspectives). Furthermore, while FIG. 1 illustrates three display systems 142, any number of display systems 142 on the aircraft may be part of the correlative display system 140. One or more of the display systems 142 may be integrated into the aircraft 100, as illustrated in FIG. 1.

However, one or more other display systems 142, such as one ore more personal electronic devices, may be portable and brought onto the aircraft 100 by, for example, a crew member. When one of the display systems 142 is a personal electronic device, the display systems 142 may communicate with the aircraft 100 via any wired or wireless communication system (not illustrated) such that the personal electronic device can be integrated into the correlative display system 140.

The correlative display system 140 further includes at least one processor 144 and a memory 146. The processor 144 may be, for example, a central processing unit (CPU), a physics processing unit (PPU), a graphics processing unit (GPU), a field programmable gate array (FPGA), an application specific integrated circuit (ASIC), a microcontroller, or any other logic unit or combination thereof. The processor 144 may be dedicated to the correlative display system 140 or may be shared by one or more other systems aboard the aircraft 100. The memory 146 may be any combination of volatile and non-volatile memory. The memory 146 may store non-transitory computer-readable instructions for implementing the correlative display system 140, as discussed in further detail below. The memory 146 may be dedicated to the correlative display system 140 or may be shared by one or more other systems aboard the aircraft 100.

The correlative display system 140 further includes a user interface 148. The user interface 148 may include one or more of a touch screen, a mouse, a trackpad, a trackball, a scroll wheel, a microphone, or the like, or any combination thereof. Each display system 142 may have a unique user interface 148 dedicated to the respective display system 142 or a user interface 148 may be shared across one or more display systems 142. A user, such as the pilot or another crew member, may input commands to the correlative display system 140 through the user interface 148, as discussed in further detail below.

The display systems 142 may display, for example, a vertical profile of a flight plan, a horizontal profile of a flight plan, a waypoint list, obstacles along the planned flight path on a lateral and vertical map potentially having impact for the planned operations, VFR reference points, airspace elements, temporary flight restriction areas, significant weather events such as severe turbulence, lighting, storms, or the like displaying a variety of different features. A processor 144 of the correlative display system 140 determines which feature is selected, hovered over, or otherwise interacted within a first display system 142, determines where the corresponding feature is or would be displayed on other display systems 142, and generates instructions to highlight or otherwise identify the feature on the other display systems 142. The correlation may be based upon, for example, data from the FMS 120.

Figure 2:
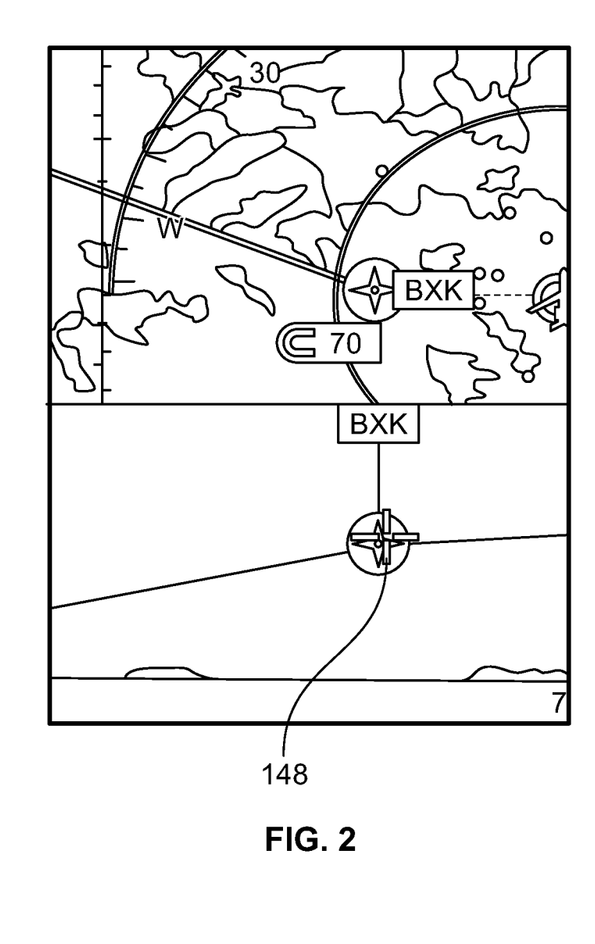
FIGS. 2-3 illustrates examples of the correlative display system, in accordance with an embodiment.
Figure 3:
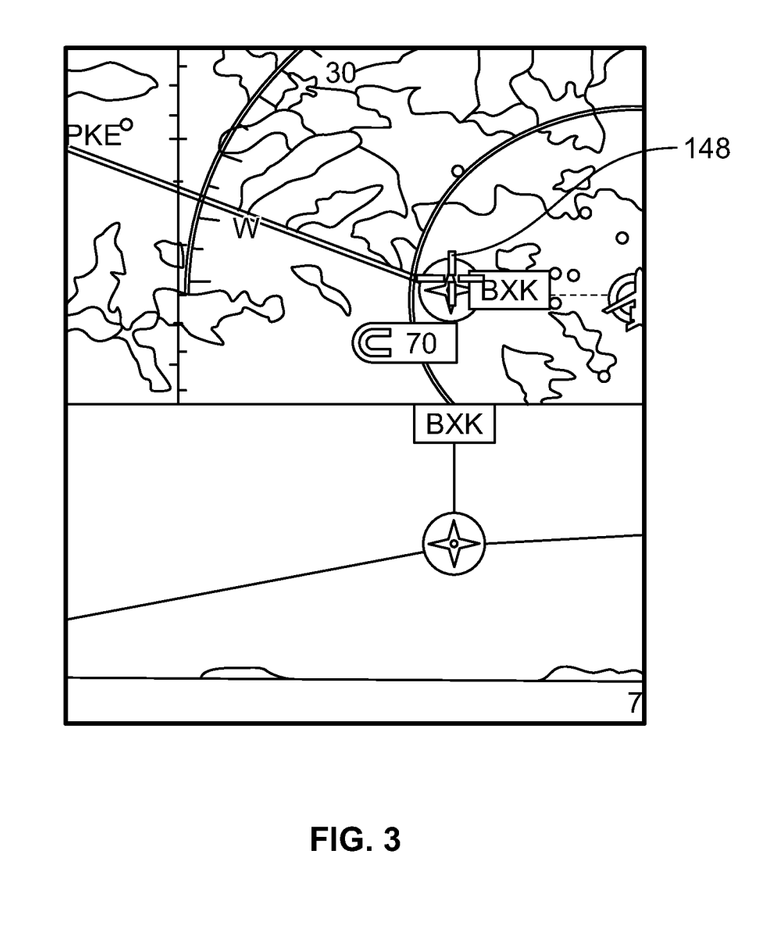

FIGS. 2-3 illustrates examples of the correlative display system 140, in accordance with an embodiment. As seen in FIG. 2, a cursor from the user interface 148 is hovering over a waypoint in a vertical situation display (i.e., one of the display systems 142). The processor 144 identifies the feature, in this case a waypoint, and highlights the feature on other display system 142, in this example a lateral situation display. FIG. 3 illustrates the opposite example where a cursor is hovering over a waypoint on a lateral situation display and the processor 144 highlights the corresponding waypoint on the vertical situation display. By automatically correlating and highlighting corresponding features, situational awareness for the pilot is improved, workload is reduced (as the pilot does not have to analyze multiple displays to deduce the corresponding features), and pilot interpretation errors are reduced.

Figure 4:
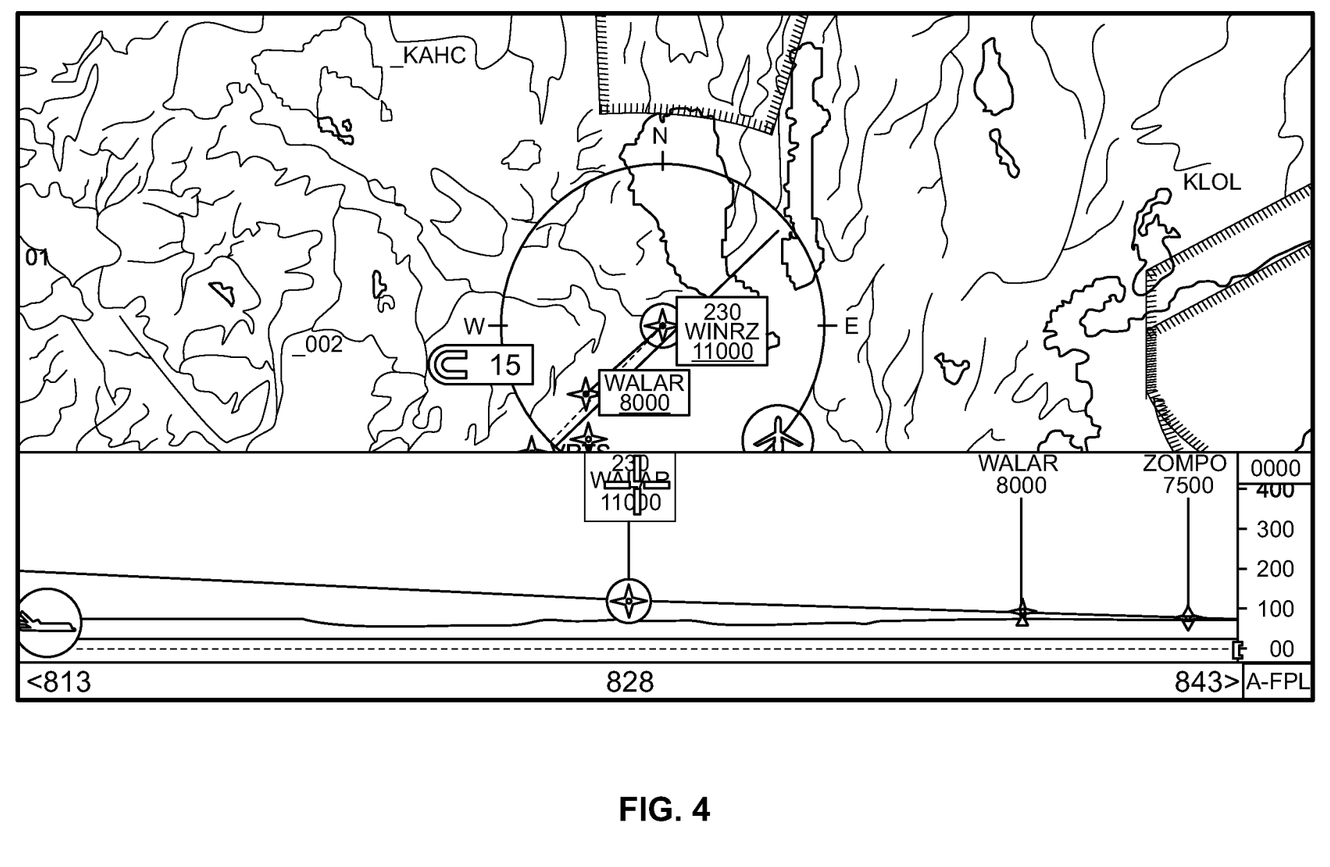
FIG. 4 illustrates another correlative display system, in accordance with an embodiment.

The features which can be correlated include, but are not limited to, waypoints, constraints, airspaces, idents, runways, gates, taxiways, airports, aircraft, weather phenomena, or the like. FIG. 4 illustrates another correlative display system 140, in accordance with an embodiment. As seen in FIG. 4, an ident is hovered over in a vertical situation display. The processor 144 identifies the ident and highlights the same ident in all of the other displays where the ident is visible, in this example, a lateral situation display.

The features may be highlighted in any manner. In the examples illustrated in FIGS. 2-4, the highlighted feature is shown with a differently colored outline relative to other features on the respective display. However, the features may be highlighted using any combination of font color, background color, font, italicizing, bolding, outline, arrows or other indicators pointing at the feature, such as a geographic area or shape relevant to the events of interests, or the like, or any combination thereof.

The examples illustrated in FIGS. 2-4 are simple examples of the correlative feature where the exemplary display systems 142 are adjacent (i.e., share the same screen), at relatively similar scales (e.g., a lateral situation display and a horizontal situation display may both have a one-hundred nautical mile range), and be displaying data in a similar format (e.g., a map). However, the display systems 142 may be not necessarily be adjacent, may have vastly different scales, and may be displaying the data in different formats. For example, a pilot may use a personal electronic device, such as a tablet computer), to display a list of waypoints for a flight plan. When the pilot selects a waypoint from the waypoint list, the processor 144 may identify the same waypoint on a lateral situation display having a scale of five-hundred nautical miles, a vertical situation display having a scale of twenty-five nautical miles, and on a synthetic vision display and highlight the waypoint on all of the differently displays, thereby improving the situational awareness across all of the different display systems 142.

The examples illustrated in FIGS. 2-4 also show examples of the correlative feature where the exemplary display systems 142 are both displaying the feature which is highlighted. However, the display systems 142 may not always show all of the features on the respective display which may be highlighted. In other words, the feature to be correlated across the display systems 142 may not be native to one of the display systems or may be hidden on a respective display system, as discussed in further detail below. For example, a weather phenomenon in a geographic referenced format would not normally displayed on a waypoint list. Similarly, terrain and airspace information is not usually represented by the type of text based display format such as a waypoint list. By correlating a selected feature across multiple display systems 142, the operator of the aircraft receives a much better appreciation of where the feature is relative to the other data presented on the respective display system 142.

In one embodiment, for example, the correlative display system 140, or a display system 142 itself, may also perform feature decluttering. On display systems 142, such as lateral and vertical situation displays, alphanumeric text is associated with waypoints, airports and other features. Depending upon the scale of the respective display, the alphanumeric text may overlap for features which are close together, making it difficult for the pilot to read, identify and locate features on the display. The correlative display system 140 provides a smart decluttering of feature labels by prioritizing features for display. The processor 144 is configured to detect overlapping identifiers (i.e., the text on the respective display system 142) and remove the identifiers having lower priority. The priority of the identifiers is predefined based on the criticality of information. In one embodiment, for example, the 'TO' Waypoint has highest priority, followed by three Next waypoints. The priority keeps reducing for rest of the down-path waypoints except for a Destination waypoint which has priority lower than "TO" waypoint and higher than everything else. If any of the three Next waypoints overlap, the waypoint which has constraints associated to it will have the higher priority over others. However, the priorities can be customized by each pilot to suit their preferences. For example, waypoints with altitude constraints can be selected to have a higher priority than waypoints with speed constraints.

Figure 5:
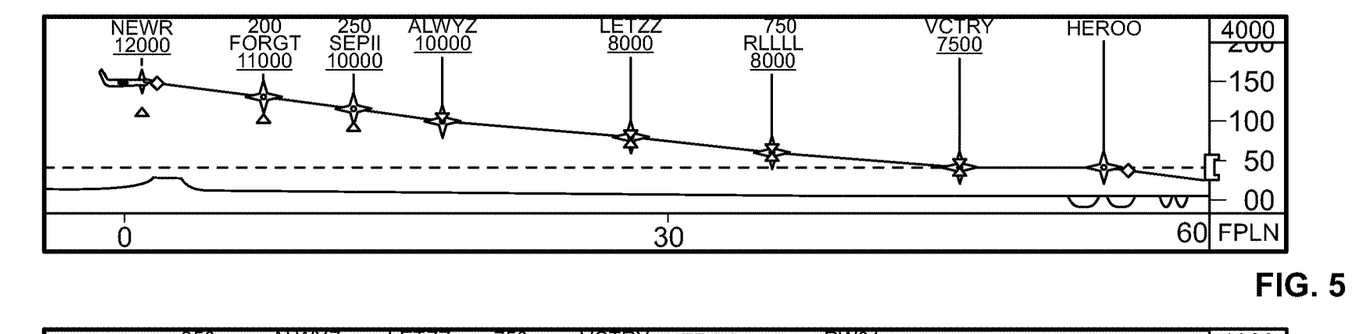
FIGS. 5-7 illustrate waypoint decluttering at a variety of ranges, in accordance with an embodiment.
Figure 6:
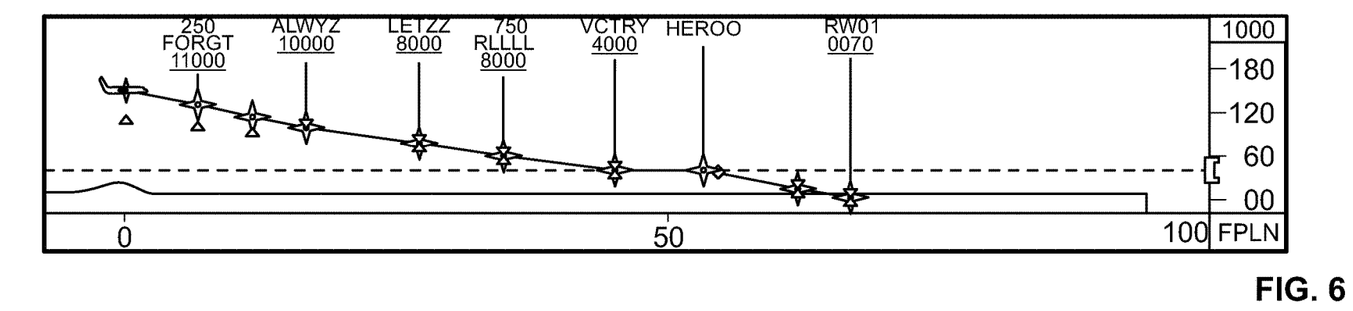
Figure 7:
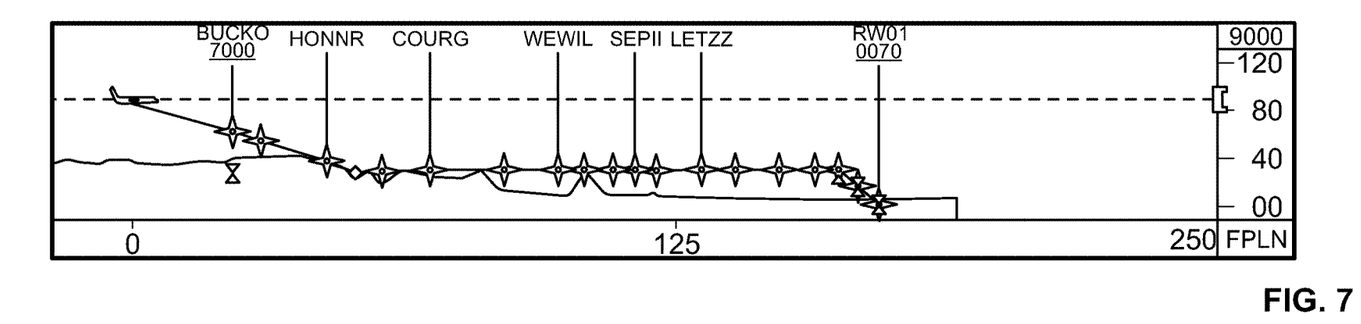

FIGS. 5-7 illustrate waypoint decluttering at a variety of ranges. FIG. 5 illustrates a vertical situation display at a sixty nautical mile range, FIG. 6 illustrates a vertical situation display at a one-hundred nautical mile range and FIG. 7 illustrates a vertical situation display at a two-hundred fifty nautical mile range. As seen in FIG. 5, the range allows all of the identifiers for all of waypoints to be displayed. However, as the range is increased in FIGS. 6 and 7, the text for the identifiers of waypoints would overlap. Accordingly, as discussed above, the processor 144 prioritizes the waypoints based upon a predefined priority list and removes the identifies of lower priority waypoints for any having overlapping text. The decluttering improves the readability of the respective display system 142 by removing overlapping lower priority features, thereby improving the readability of high priority features. In other words, the decluttering makes it easier for a user to find an important feature by removing text which would overlap that feature.

Figure 8:
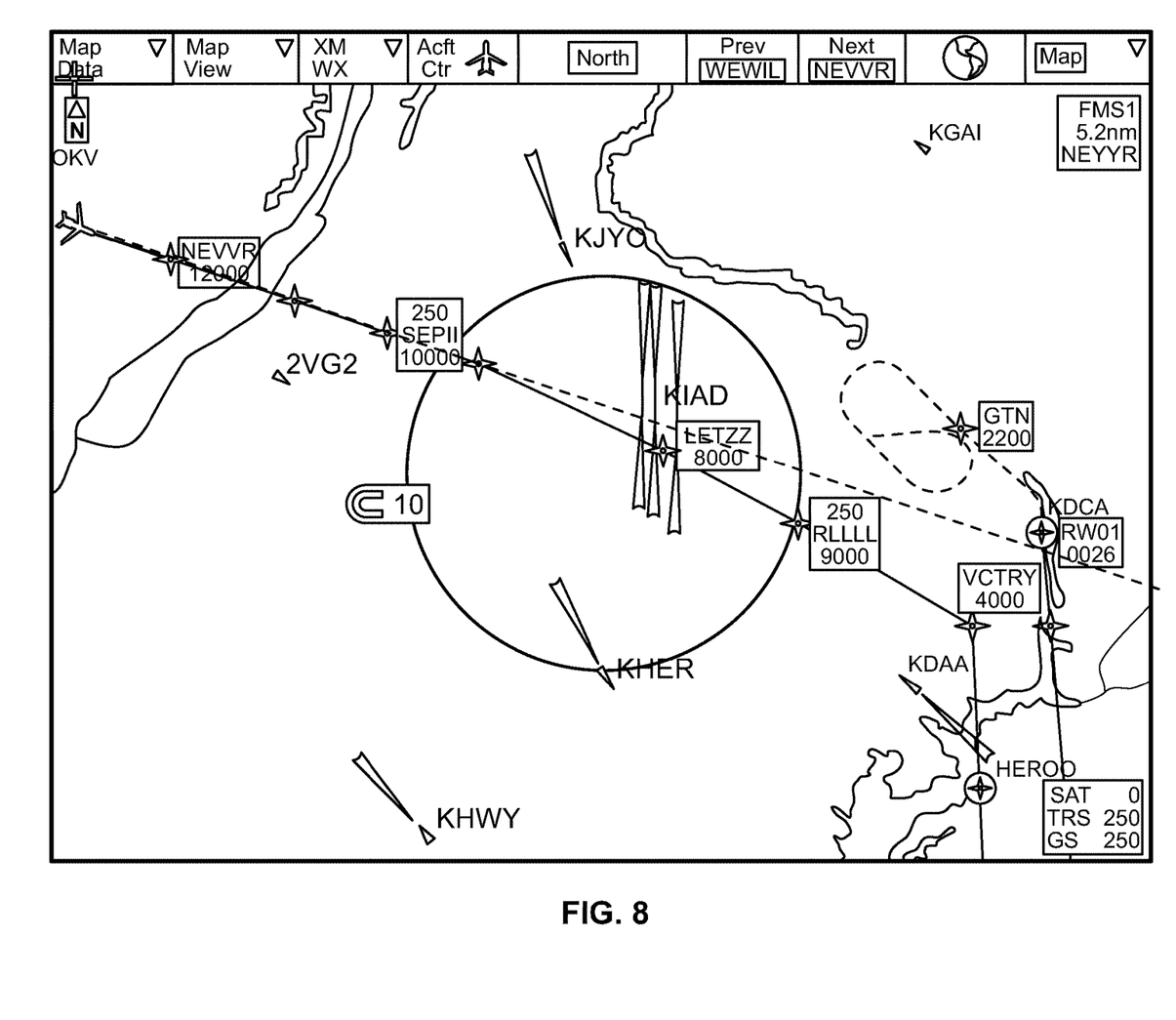
FIGS. 8-10 illustrate waypoint decluttering at a variety of ranges for a lateral situation display, in accordance with an embodiment.
Figure 9:
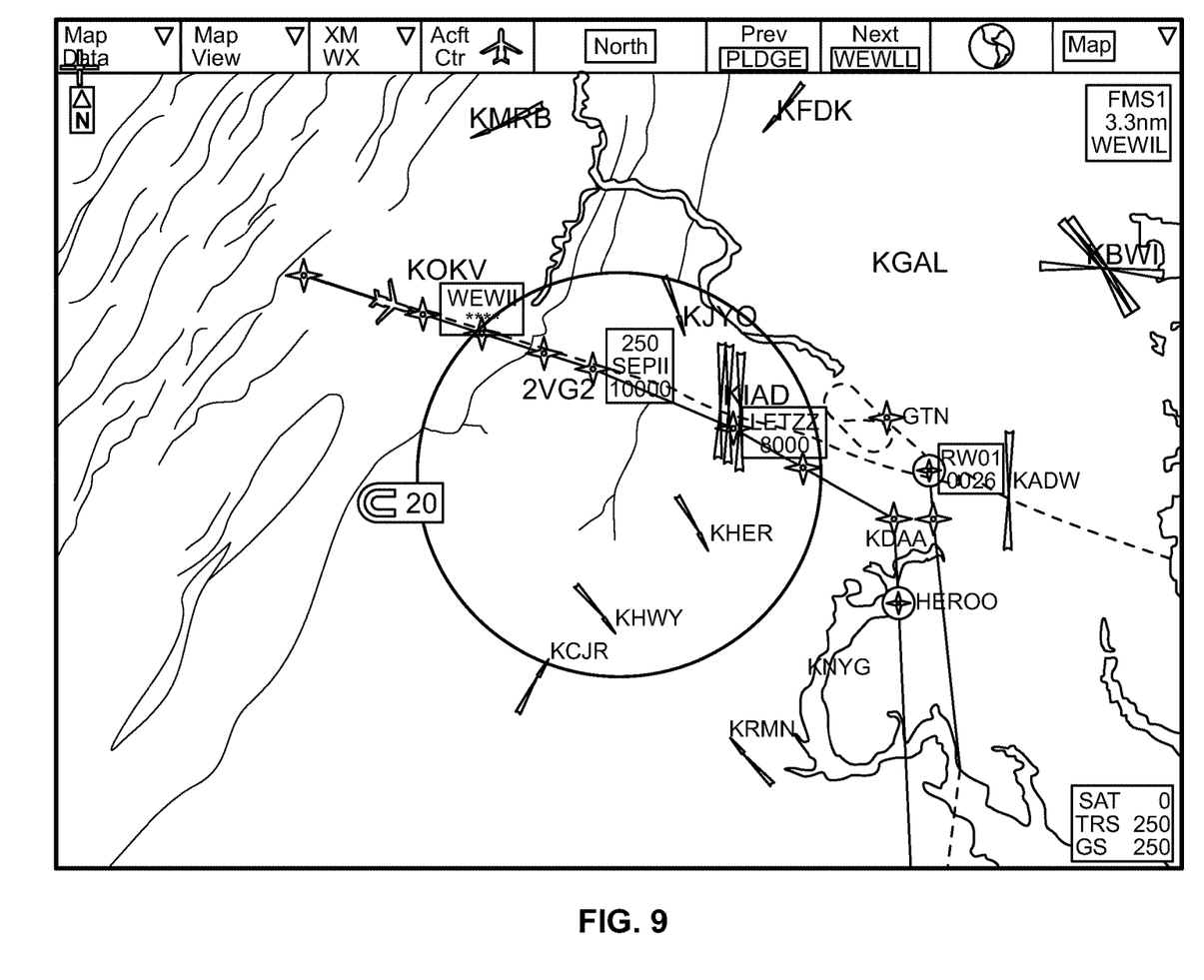
Figure 10:
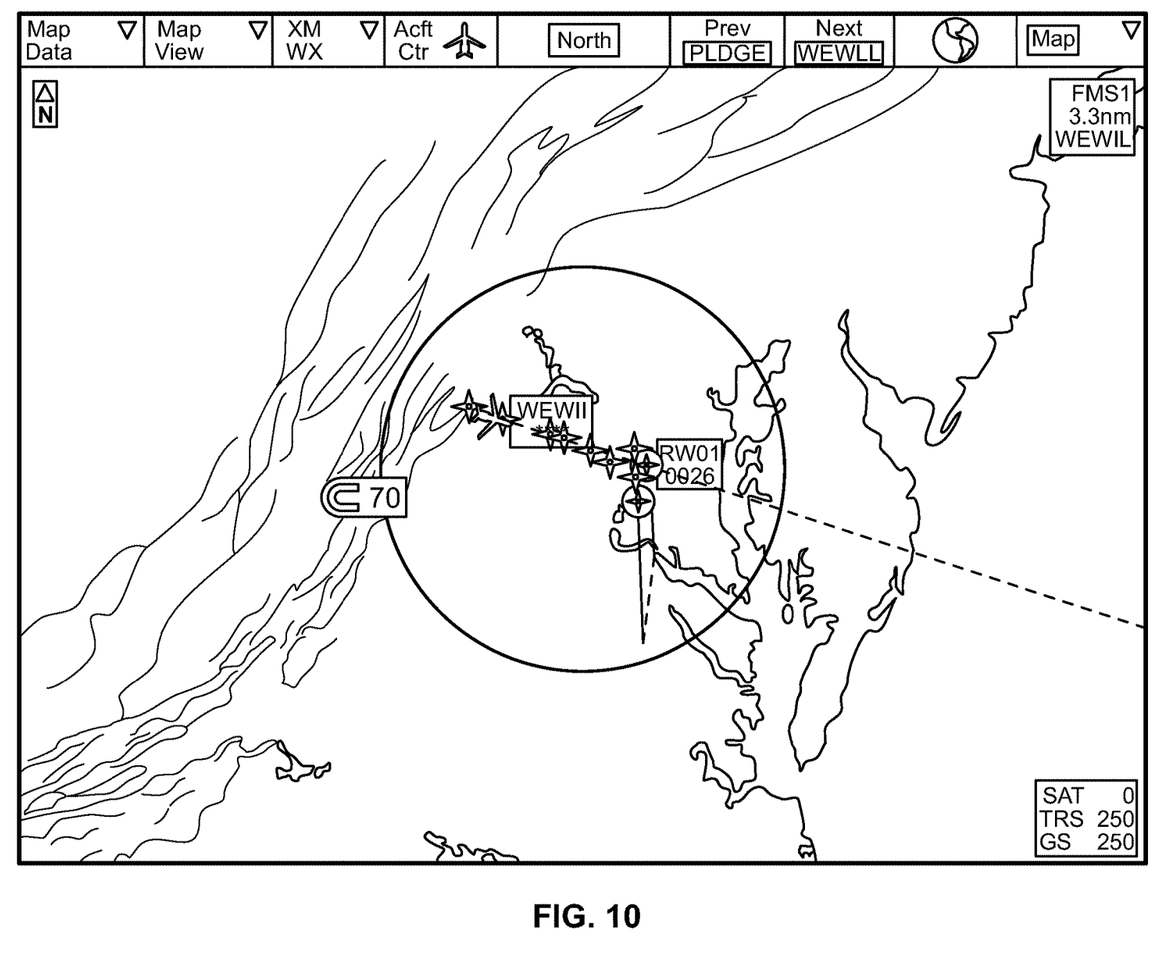

FIGS. 8-10 illustrate waypoint decluttering at a variety of ranges for a lateral situation display. FIG. 8 illustrates a lateral situation display at a ten nautical mile range, FIG. 9 illustrates a lateral situation display at a twenty nautical mile range and FIG. 10 illustrates a lateral situation display at a seventy nautical mile range. As seen in FIG. 8, the range allows a lot of the waypoints and other features to be displayed. However, as the range is increased in FIGS. 9 and 10, the text for the waypoints and other features would overlap given the scale. Accordingly, as discussed above, the processor prioritizes the waypoints and removes the identifier for any lower priority waypoints having overlapping text.

Figure 11:
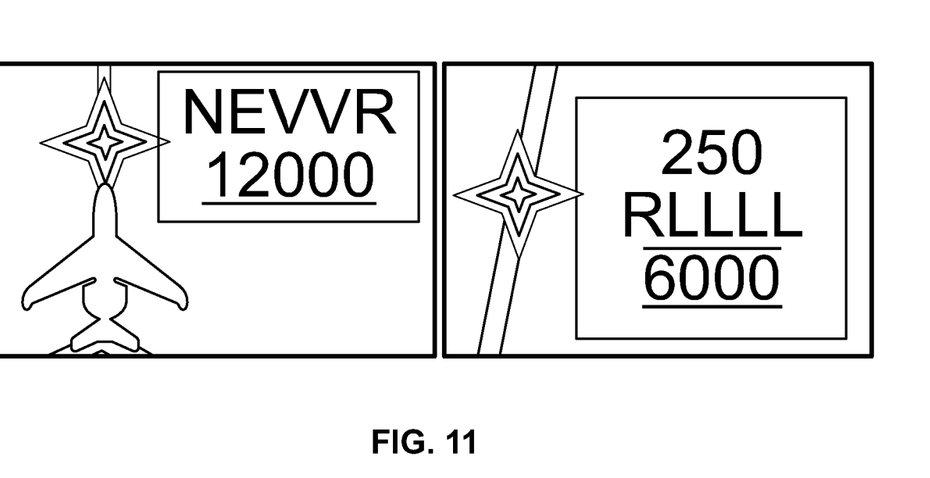
FIG. 11 illustrates an exemplary constraint display for a lateral situation display, in accordance with an embodiment.
Figure 12:
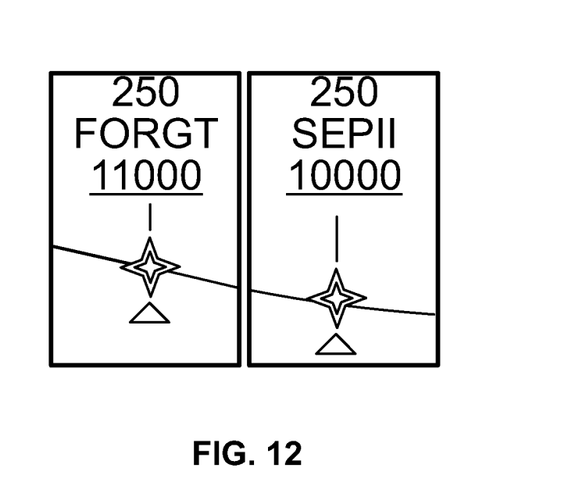
FIG. 12 illustrates an exemplary constraint display for a vertical situation display, in accordance with an embodiment.

In addition to waypoint identifier declutter, waypoint name, speed and altitude constraints may be grouped by the processor 144 to provide a clean and more modern user interface. In other words, the correlative display system may correlate data relative to a feature retrieved from the FMS 120 to reduce pilot workload and increase the readability of the data related to a feature. For example, for a waypoint having speed constraints, the speed text may be placed above the waypoint name and for the waypoints having altitude constraints, the altitude texts may be placed below the waypoint name. The group of texts may be vertically center justified with the waypoint symbol in lateral map and horizontally center justified for Vertical map. FIG. 11 illustrates an exemplary constraint display for a lateral situation display and FIG. 12 illustrates an exemplary constraint display for a vertical situation display.

The declutter logic and grouping of waypoint name and constraint texts applies for both lateral and vertical flight plan display. However, this does not mean that the waypoint identifiers displayed on, for example, a lateral situation display would always be displayed on a vertical situation display as well. As discussed above, a waypoint in one display may be decluttered in another display due to different scales used to render the respective maps. Accordingly, if a user hovers over or otherwise interacts with a feature on one display which has been decluttered in another display, the processor 144 of the correlative display system 140 may reintroduce the decluttered feature and highlight the feature in the other display as discussed above.

Figure 13:
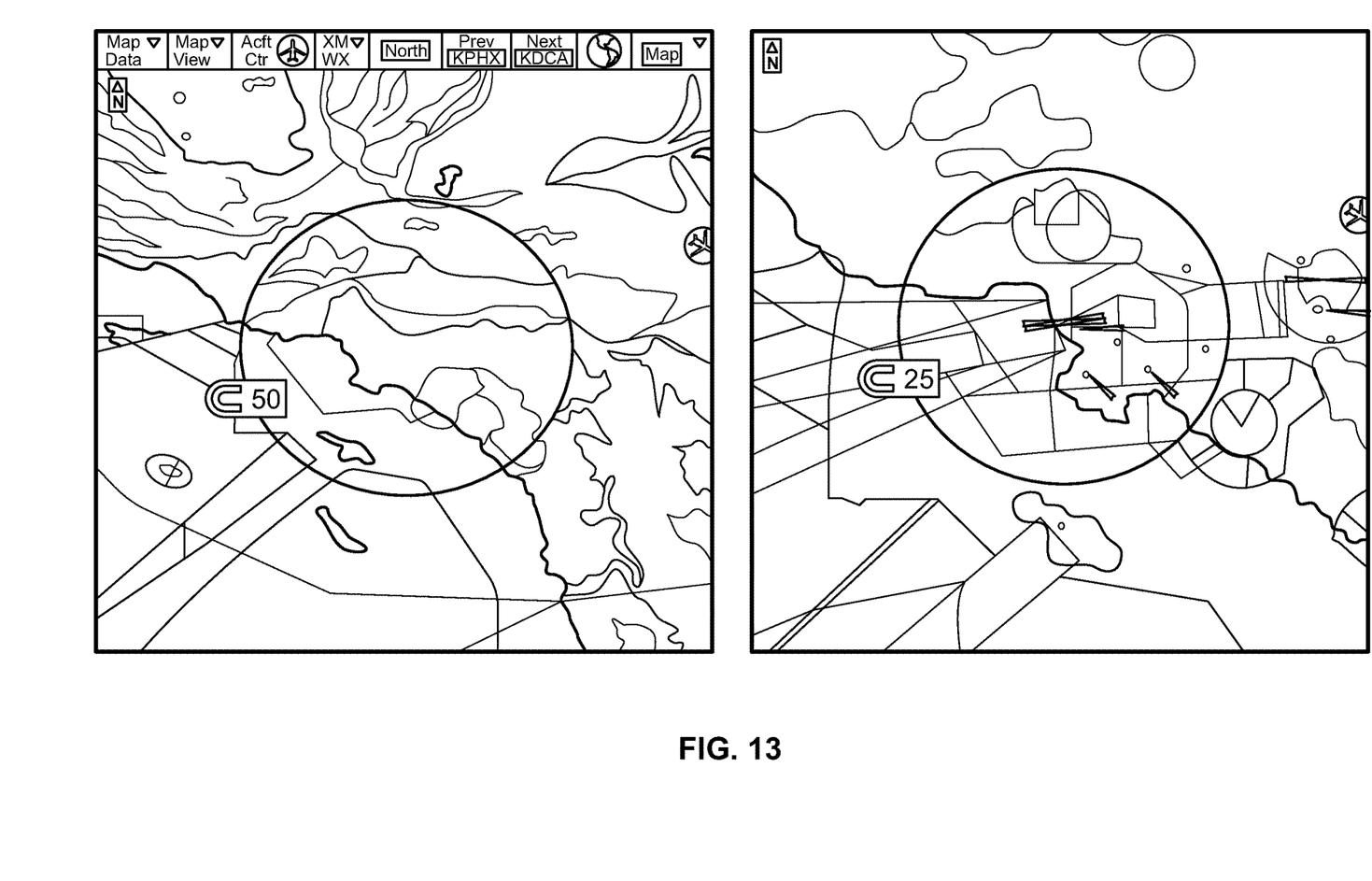
FIG. 13 illustrates an example of airspace declutter, in accordance with an embodiment.

FIG. 13 illustrates an example of airspace declutter, in accordance with an embodiment. As seen in FIG. 13, the system provides a smart declutter of terminal airspace. At higher ranges (i.e., the left side of FIG. 13), the display only shows the perimeter airspace. As the range numbers get smaller (i.e., the right side of FIG. 13), the system fades in additional airspace boundaries. This will improve readability and usability of map, in particular at higher ranges.

Figure 14:
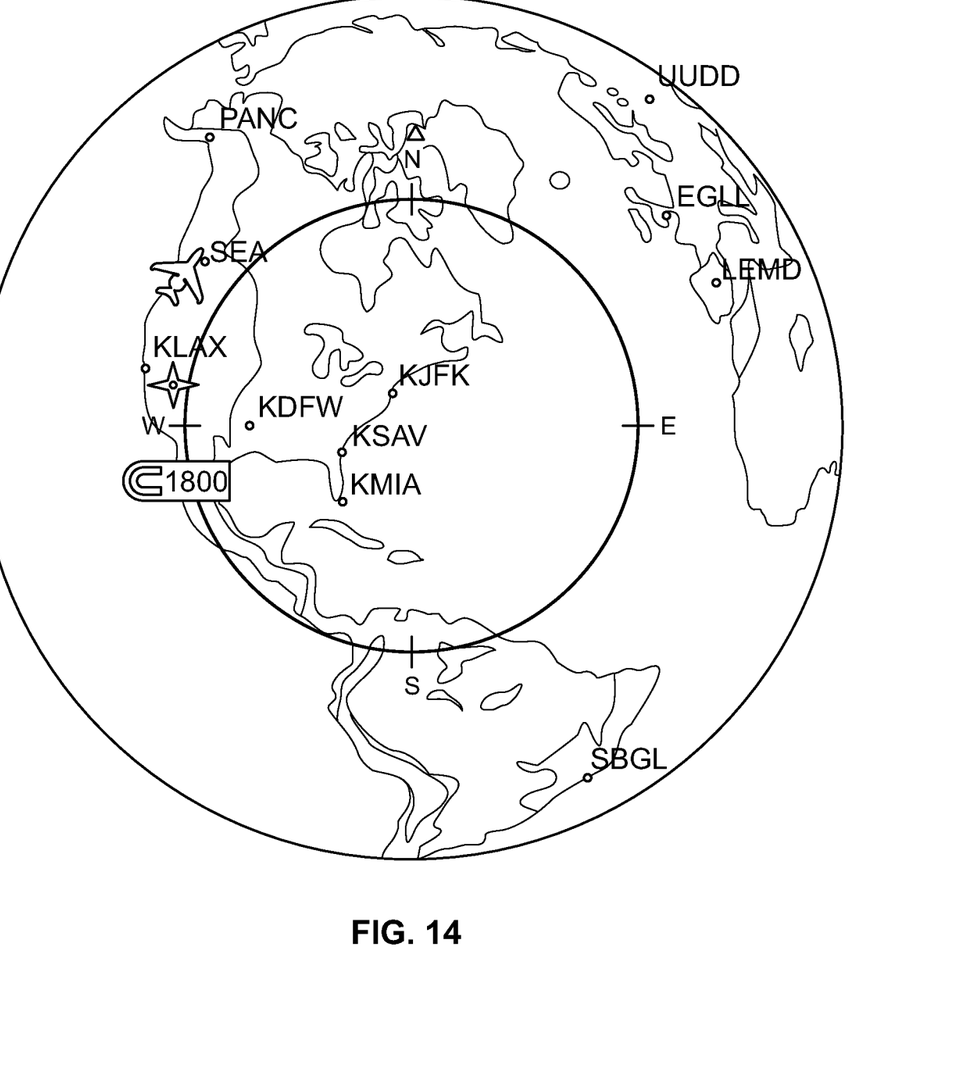
FIG. 14 illustrates an example of airport declutter in a super major airport display, in accordance with an embodiment.

FIG. 14 illustrates an example of airport declutter in a super major airport display, in accordance with an embodiment. The system may provide a continuous depiction of, for example, thirty-eight airport labels at all ranges. The priority airports may include, but are not limited to, KSAV, KJFK, KLAX, KSFO, KBOS, KDEN, KDFW, KORD, KIAH, KPHX, KSEA, KMIA, CYYZ, ZBAA, ZSPD, EGLL, LFPG, EDDF, VHHH, PANC, UUDD, OMDB, RJTT, EGLL, VHHH, LFPG, WSSS, RKSI, VTBS, VIDP, WIII, WMKK, LEMD, ZUUU, VABB, VOBL, YSSY, SBGL. The continuous presentation of Super Major Airports will provide pilots with an enhanced persistent navigation orientation anchor points at large ranges. Here, the declutter priority is dependent upon the range settings and, at large display ranges, the large airport features with strategic geographic representations are of greater importance. In a similar context, when an aircraft is operating in an oceanic route or other geographic corridor, priority is also given to the airports useful for emergency diversions along the planned path.

Figure 15:
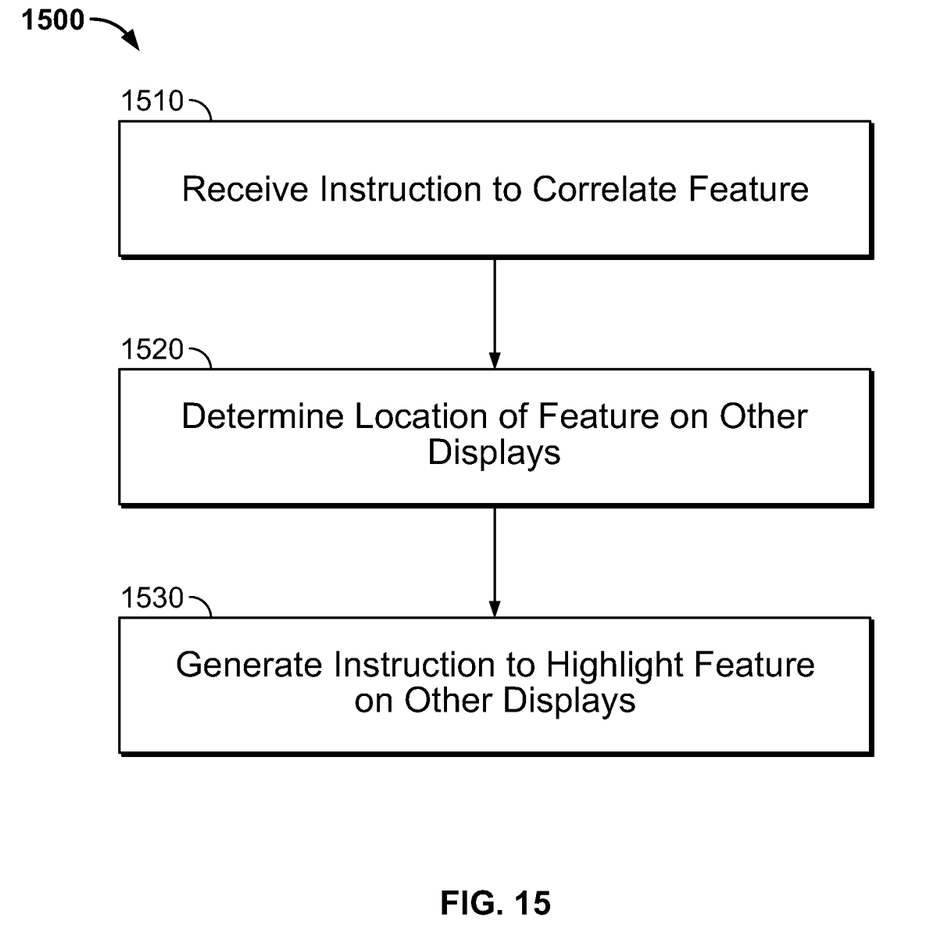
FIG. 15 is a flow chart illustrating a method of operating the correlative display system, in accordance with an embodiment.

FIG. 15 is a flow chart illustrating a method 1500 of operating the correlative display system 140, in accordance with an embodiment. The method begins when a user selects, hovers over or otherwise interacts with a feature using a user interface 148, thereby generating instructions to correlate the feature on other displays. (Step 1510). The instruction may be generated by a processor 144, such as the processor 144 associated with the display system 142. A processor 144 may then determine a location of the feature on other display systems 142 of the correlative display system. (Step 1520). In one embodiment, for example, the processor 144 may communicate with the FMS 120 to determine the location of the feature on the other display systems. For example, when the selected feature is not native to the respective display system (e.g., a weather phenomenon relative to a list of waypoints), the data from the FMS 120 may be used to extrapolate where the feature would be relative to the data displayed on the respective display system 142. In other embodiments, the display system 142 may know where the feature is. As discussed above, the display systems 142 themselves, or with the assistance of the correlative display system 140, may declutter their respective display system 142. In these instances, the location of certain features (e.g., waypoints, runway, idents, etc.) may already be known, and may merely have to be redisplayed on the respective display systems 142 if they have been decluttered.

The processor 144 then generated instructions to highlight the feature of the other display systems. (Step 1530). The highlighting may be done in a variety of different ways depending upon how data is typically displayed on the respective display system 142. The feature, for example, may be highlighted using any combination of font color, background color, font, italicizing, bolding, outline, arrows or other indicators pointing at the feature, or the like, or any combination thereof.

Accordingly, the correlative display system 140 improves situational awareness of the crew by correlating data across multiple display systems, thereby giving the crew a better appreciation of the location of a feature relative to other features. This eliminates the need for pilots to themselves extrapolate the location of features across different display systems, reducing the workload on the crew.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
a flight management system configured to monitor flight plan data for the aircraft, the flight plan data indicative of a planned flight path; and
a correlative display system communicatively coupled to the flight management system, the correlative display system comprising:
a plurality of displays, each of the plurality of displays displaying data relevant to the planned flight path;
a user interface system configured to receive user input;
a memory configured to store priority data associated with each feature of a plurality of features; and
a processor communicatively coupled to the plurality of displays and the user interface, the processor configured to:
determine when the user input received by the user interface corresponds to one of the plurality of features on a first of the plurality of displays;
identify the feature on the first of the plurality of displays;
determine a location of the identified feature relative to the data displayed on each other of the plurality of displays, wherein the identified feature is not previously displayed on at least one of the other of the plurality of displays;
generate instructions for the other of the plurality of displays to highlight the feature at the determined location for each of the other plurality of displays;
determine when graphical or textual information corresponding to multiple features on any of the plurality of displays overlap;
compare the priority data corresponding to the overlapping features;
generate instructions to declutter the plurality of displays by only displaying the highest priority feature of the overlapping features; and
generate instructions to redisplay the identified feature on a respective one of the plurality of displays when the identified feature is a feature which has been decluttered from the display.

2. The aircraft according to claim 1 wherein feature priority is based at least in part on one or more of display range, aircraft operational environment, and airports within a geographic corridor that are useful for diversion along a planned path.

3. The aircraft according to claim 1, wherein one of the plurality of displays is a personal electronic device.

4. The aircraft according to claim 1, wherein the identified feature is a weather phenomenon.

5. The aircraft according to claim 1, wherein the identified feature is a waypoint.

6. The aircraft according to claim 1, wherein the identified feature is a constraint.

7. The aircraft according to claim 1, wherein the identified feature is another aircraft.

8. A method of operating a correlative display system for a plurality of display systems on an aircraft, comprising:

receiving, by a processor, an identification of a feature from a user interface associated with a first display system of the plurality of display systems;

determining, by the processor, a location of the identified feature relative to data displayed on each other display system of the plurality of display systems, wherein the identified feature is not previously displayed on at least one of the other display systems of the plurality of display systems;

generating, by the processor, instructions to highlight the identified feature on each other display system of the plurality of display systems at the determined location relative to data displayed on each other display system;

determining when graphical or textual information corresponding to multiple features on any of the plurality of displays overlap;

comparing, by the processor, priority data stored in a memory corresponding to the overlapping features;

generating, by the processor, instructions to declutter the plurality of displays by only displaying the highest priority feature of the overlapping features; and generating instructions, by the processor, to redisplay the identified feature on the respective one of the plurality of displays when the identified feature is a feature which has been decluttered from one of the plurality of displays.

9. The method according to claim 8, wherein one of the plurality of displays is a personal electronic device.

10. The method according to claim 8, wherein the identified feature is a weather phenomenon.

11. The method according to claim 8, wherein the identified feature is a waypoint.

12. The method according to claim 8, wherein the identified feature is a constraint.

13. The method according to claim 8, wherein the identified feature is another aircraft.

14. A correlative display system, comprising:

a plurality of displays, each of the plurality of displays operable to display different flight plan data;

a user interface system configured to receive user input; and a processor communicatively coupled to the plurality of displays and the user interface, the processor configured to:

determine when the user input received by the user interface corresponds to a feature on a first of the plurality of displays;

identify the feature on the first of the plurality of displays;

determine a location of the identified feature relative to the data displayed on each other of the plurality of displays, wherein the identified feature is not previously displayed on at least one of the other of the plurality of displays; and generate instructions for the other of the plurality of displays to highlight the feature at the determined location for each of the other plurality of displays;

determine when graphical or textual information corresponding to multiple features on any of the plurality of displays overlap;

compare priority data stored in a memory corresponding to the overlapping features;

generate instructions to declutter the plurality of displays by only displaying the highest priority feature of the overlapping features; and generate instructions to redisplay the identified feature on the respective one of the plurality of displays when the identified feature is a feature which has been decluttered from one of the plurality of displays.

15. The correlative display system according to claim 14, wherein:

one of the plurality of displays is a personal electronic device; and the identified feature is one of a waypoint, a constraint, an airspaces, an idents, a runway, a gate, a taxiway, an airport, an aircraft and a weather phenomenon.

* * * * *